US007701170B2

United States Patent
Kim

(10) Patent No.: US 7,701,170 B2
(45) Date of Patent: Apr. 20, 2010

(54) SECONDARY BATTERY PACK WITH FRAME FOR BATTERY MOUNTING

(75) Inventor: Sun Jae Kim, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 604 days.

(21) Appl. No.: 11/236,307

(22) Filed: Sep. 26, 2005

(65) Prior Publication Data
US 2006/0091851 A1 May 4, 2006

(30) Foreign Application Priority Data
Sep. 24, 2004 (KR) ............ 10-2004-0077231

(51) Int. Cl.
*H02J 7/00* (2006.01)
(52) U.S. Cl. ............ 320/112; 320/107; 429/99; 429/151; 429/163
(58) Field of Classification Search ........... 320/107, 320/110, 112–114, 106; 429/9, 163, 151, 429/176–178
See application file for complete search history.

(56) References Cited

U.S. PATENT DOCUMENTS

| 5,204,608 | A | * | 4/1993 | Koenck ............ 320/112 |
| 5,317,247 | A | * | 5/1994 | Chong et al. ............ 320/112 |
| 5,733,674 | A | * | 3/1998 | Law et al. ............ 429/9 |
| 5,798,906 | A | * | 8/1998 | Ando et al. ............ 361/520 |
| 5,827,999 | A | * | 10/1998 | McMillan et al. ............ 174/539 |
| 6,004,692 | A | * | 12/1999 | Muffoletto et al. ............ 429/163 |
| 6,048,642 | A | * | 4/2000 | Woolsey ............ 429/163 |
| 6,084,380 | A | * | 7/2000 | Burton ............ 320/107 |
| 6,218,041 | B1 | * | 4/2001 | Barbier et al. ............ 429/96 |
| 6,265,844 | B1 | * | 7/2001 | Wakefield ............ 320/107 |
| 6,461,764 | B1 | * | 10/2002 | Nakamura ............ 429/170 |
| 6,636,016 | B2 | * | 10/2003 | Tanaka et al. ............ 320/107 |
| 6,808,844 | B2 | * | 10/2004 | Ehara ............ 429/175 |
| 6,869,299 | B2 | * | 3/2005 | Tanaka et al. ............ 439/188 |
| 7,297,439 | B2 | * | 11/2007 | Yamazaki et al. ............ 429/121 |
| 7,393,611 | B2 | * | 7/2008 | Hamada et al. ............ 429/163 |
| 2002/0021107 | A1 | * | 2/2002 | Ripoll Anton et al. ............ 320/112 |
| 2002/0109480 | A1 | * | 8/2002 | Crofut et al. ............ 320/107 |
| 2002/0158604 | A1 | * | 10/2002 | Smith ............ 320/107 |
| 2002/0195992 | A1 | * | 12/2002 | Lee et al. ............ 320/112 |
| 2003/0077486 | A1 | * | 4/2003 | Iwaizono et al. ............ 429/7 |
| 2003/0085685 | A1 | * | 5/2003 | Usui et al. ............ 320/112 |
| 2003/0170530 | A1 | * | 9/2003 | Nishimura et al. ............ 429/61 |
| 2004/0095093 | A1 | * | 5/2004 | Baba et al. ............ 320/112 |
| 2004/0126651 | A1 | * | 7/2004 | Kim et al. ............ 429/61 |
| 2004/0251872 | A1 | * | 12/2004 | Wang et al. ............ 320/112 |
| 2009/0246616 | A1 | * | 10/2009 | Koyama et al. ............ 429/153 |

FOREIGN PATENT DOCUMENTS

KR 10-2004-0011818 2/2004

* cited by examiner

*Primary Examiner*—Edward Tso
*Assistant Examiner*—Arun Williams
(74) *Attorney, Agent, or Firm*—Christie, Parker & Hale, LLP

(57) ABSTRACT

A battery pack including a secondary battery and a frame for mounting the secondary battery therein. A mounting ledge protrudes from one portion of the frame and a guide member protrudes from another portion of the frame. A circuit section is installed at a portion of the frame and inserted between the mounting ledge and the guide member so as to be connected to the secondary battery. A fixing part is provided in the frame and the circuit section in order to fix the circuit section to the frame.

9 Claims, 3 Drawing Sheets

SECONDARY BATTERY PACK WITH FRAME FOR BATTERY MOUNTING

CROSS-REFERENCE TO RELATED APPLICATION(S)

This application claims priority to and the benefit of Korean Patent Application No. 2004-0077231 filed on Sep. 24, 2004 in the Korean Intellectual Property Office, the entire content of which is incorporated herein by reference.

BACKGROUND OF THE INVENTION

1. Field of the Invention

The present invention relates to a battery pack. More particularly, the present invention relates to a secondary battery pack for improved accommodation of a secondary battery.

2. Description of the Prior Art

Recently, electronic appliances having compact sizes with light weight, such as cellular phones, notebook computers and camcorders, have been actively developed and produced. Such electronic appliances are equipped with battery packs so that users can use the electronic appliances in various places even if electric power sources are not separately provided for the electronic appliances. The battery pack includes at least one battery capable of outputting an operational voltage to operate the electronic appliances for a predetermined period of time.

Secondary batteries, which are rechargeable batteries, are currently employed in a secondary pack due to the economical advantages of a battery pack. The secondary batteries include Ni—Cd batteries, Ni-MH batteries and Li secondary batteries, such as Li batteries or Li-ion batteries.

Most secondary batteries include an electrode assembly consisting of a positive electrode, a negative electrode and a separator interposed between the positive electrode and the negative electrode. The electrode assembly is accommodated in a can made from aluminum or an aluminum alloy and the can is sealed by means of a cap assembly. After the can has been sealed by the cap assembly, an electrolyte is injected into the can through an electrolyte injection hole, and then the electrolyte injection hole is sealed, thereby completing the fabrication of the secondary battery. Although iron can be used as a material for the can, if the can is fabricated by using aluminum or an aluminum alloy, the secondary battery has a light weight and is resistant to erosion even if the secondary battery is used for a long period of time under high voltage.

A battery pack is constructed by using a plurality of secondary batteries. In general, a battery pack includes a pack case having an insulation property. In addition, a plurality of batteries, wiring circuits for electrically connecting the batteries to each other, safety devices and contact terminals are accommodated in the pack case for the secondary battery.

For instance, a sealed secondary battery connected with the battery accessories and the safety device, such as a positive temperature coefficient (PTC) device, a thermal fuse and a protective circuit module (PCM), are accommodated in the battery pack. Alternatively, when the secondary battery is connected to the PCM and battery accessories, molding resin is used to fill in gaps formed between the above elements in such a manner that the secondary battery, the PCM and battery accessories may be dad with the molding resin or fixed together, thereby forming the battery pack.

Safety devices are connected to positive and negative electrode terminals of the secondary battery through a predetermined conductor structure called a "lead" in order to prevent the secondary battery from malfunctioning by the interruption of current applied to the secondary battery when the voltage of the secondary battery suddenly rises due to, for example, high temperature in the secondary battery or overcharge/over-discharge of the secondary battery.

However, a conventional pack case for a secondary battery pack is often sized slightly larger than that of products installed in the pack case in order to allow the products, such as the secondary battery, the protective circuit module and the safety device, to be easily installed in the pack case.

For this reason, when the secondary battery, the protective circuit module and other battery accessories are installed in the pack case, they may be jarred when external force is applied to the pack case. If the secondary battery is suddenly moved within the pack case due to external impact applied thereto, the secondary battery may become disconnected from the protective circuit module.

SUMMARY OF THE INVENTION

Accordingly, a battery pack is provided that is capable of detachably fixing a secondary battery, a protective circuit module and other battery accessories in a pack case while stably maintaining electric connections among the secondary battery, the protective circuit module and other battery accessories.

The battery pack includes a secondary battery and a frame for mounting the secondary battery therein, the frame having a protruding mounting ledge at a first edge surface of the battery pack and a protruding guide member at a second edge surface of the battery pack opposing the first edge surface. A circuit section is insertable between the mounting ledge and the guide member so that the circuit section is connected to the secondary battery. A fixing part is provided on the circuit section for fixing the circuit section to the frame.

According to an exemplary embodiment of the present invention, a reinforcement member is formed in the circuit section through an injection molding process.

The fixing part is provided in the mounting ledge and the guide member in such a manner that the circuit section is detachably coupled to the frame by means of the fixing part.

The fixing part includes a fixing hole formed in at least one of the mounting ledge and the guide member and a fixing protrusion provided in the circuit section and inserted into the fixing hole. The fixing part further includes a guide groove formed in the mounting ledge and a guide protrusion provided in the circuit section. The guide protrusion has a shape substantially identical to that of the guide groove so that the guide protrusion is inserted into the guide groove.

The fixing protrusion includes an inclination surface which protrudes outwardly from the frame and inclines downwardly towards a front portion of the frame.

The fixing protrusion and the guide protrusion are molding products made from synthetic resin.

Additionally, a method is provided for mounting a secondary battery having a circuit section attached thereto with a battery pack, the method including providing a battery pack frame having opposing edge surfaces, each edge surface having a fixing hole and a guiding slot; mounting a fixing protrusion and a guide member onto the circuit section, the fixing protrusion being sized to fit into the fixing hole, the guiding member being sized to fit into the guiding slot and inserting the secondary battery having a circuit section into the battery pack frame such that the fixing protrusion is inserted into the fixing hole and the guiding member is inserted into the guiding slot.

DETAILED DESCRIPTION

Figure 1:
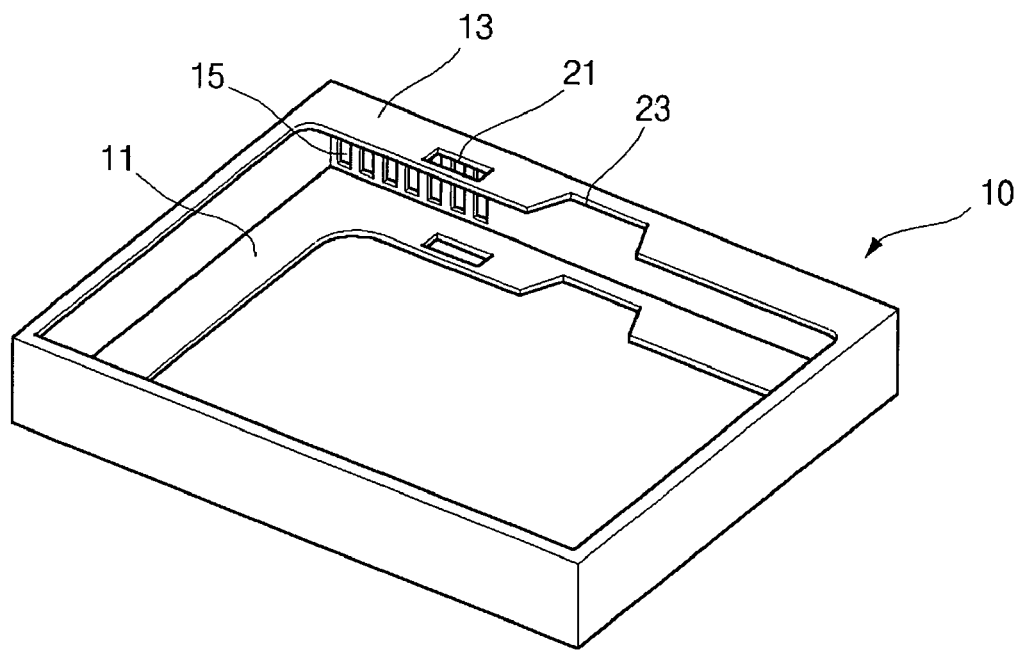
FIG. 1 is a perspective view illustrating a pack case of a secondary battery according to one embodiment of the present invention.

As shown in FIGS. 1 to 4, the secondary battery pack according to one exemplary embodiment of the present invention includes at least two secondary batteries 30, a frame 10 for mounting the secondary batteries 30 therein, a circuit section 40 installed in the frame 10 so as to be connected to the secondary batteries 30, and a fixing part 20 for fixing the circuit section 40 to the frame 10.

The secondary battery 30 includes an electrode assembly having a positive electrode, a negative electrode and a separator interposed between the positive electrode and the negative electrode. The electrode assembly is accommodated in a can made from aluminum or an aluminum alloy. The can is sealed by means of a cap assembly. An electrolyte is injected into the can through an electrolyte injection hole, and then the electrolyte injection hole is sealed.

The frame 10 may have a hexahedral shape, the upper and lower portions of which are opened. A mounting ledge 11 protrudes from a lower inner portion of the frame 10 on which secondary batteries 30 are mountable and a guide member 13 protrudes from an upper inner portion of the frame 10.

The circuit section 40 is provided with a terminal 25, which is connected to the secondary battery 30 in such a manner that the terminal is exposed out of the frame 10 by passing through a terminal hole 15 formed at a front of the frame 10. The circuit section 40 is connected to the secondary battery 30 through a lead wire 45 positioned between the circuit section 40 and the secondary battery 30.

The circuit section 40 is fixedly connected to the frame 10 by means of the fixing part 20 such that the circuit section 40 is prevented from being disconnected from the secondary battery 30.

In addition, a reinforcement member 27 (FIG. 4) is provided in the circuit section 40 in order to form the fixing part 20 while protecting the circuit section 40. That is, the reinforcement member 27 is formed at an outer surface of the circuit section 40 through an injection molding process in such a manner that an external terminal 25 is molded with circuit boards on the upper surface of the circuit section 40.

The fixing part 20, which includes a fixing protrusion 21a and a guide protrusion 23a, detachably couples the frame 10 with the circuit section 40. In one exemplary embodiment, the fixing holes 21 and the guide groove 23 are provided in both the mounting ledge 11 and the guide member 13.

The fixing protrusions 21a are mounted into fixing holes 21 formed in the mounting ledge 11 and the guide member 13, and the fixing protrusions 21a provided in the circuit section 40 pass through the fixing holes 21. In addition, the guide protrusions 23a are inserted into guide grooves 23 formed in the mounting ledge 11 and the guiding member 13, and guide protrusions 23a pass into guide grooves 23. The guide protrusion 23a has a shape identical to that of the guide groove 23 so that the guide protrusion 23a may be accommodated in the guide groove 23.

Figure 3A:
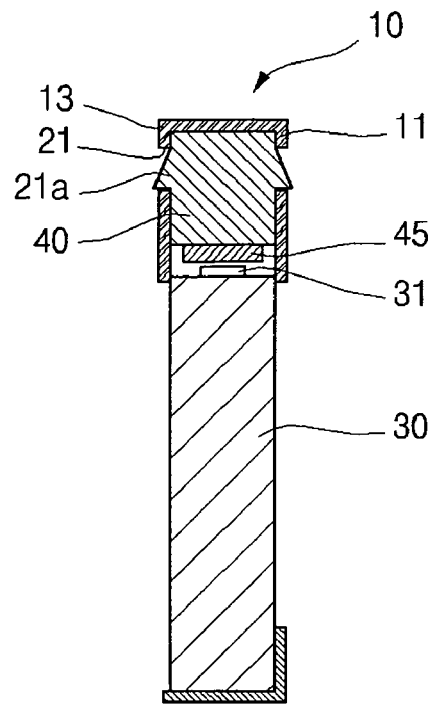
FIG. 3a is a sectional view taken along line A-A' shown in FIG. 2.

As shown in FIG. 3a, the fixing protrusion 21a includes an inclined surface which protrudes outward from the frame 10 and inclines downwardly towards the front portion of the frame 10. In one exemplary embodiment, the fixing protrusion 21a has a substantially right-angled triangular section. Accordingly, when the circuit section 40 is installed in the frame 10, the inclined surface of the fixing protrusion 21a guides the circuit section 40 such that the circuit section 40 may be stably installed in the frame 10. In addition, the fixing protrusion 21a may be prevented from protruding from the fixing hole 21 when the fixing protrusion 21a has been inserted into the fixing hole 21. In one exemplary embodiment, the fixing protrusion 21a is molded from synthetic resin.

Figure 2:
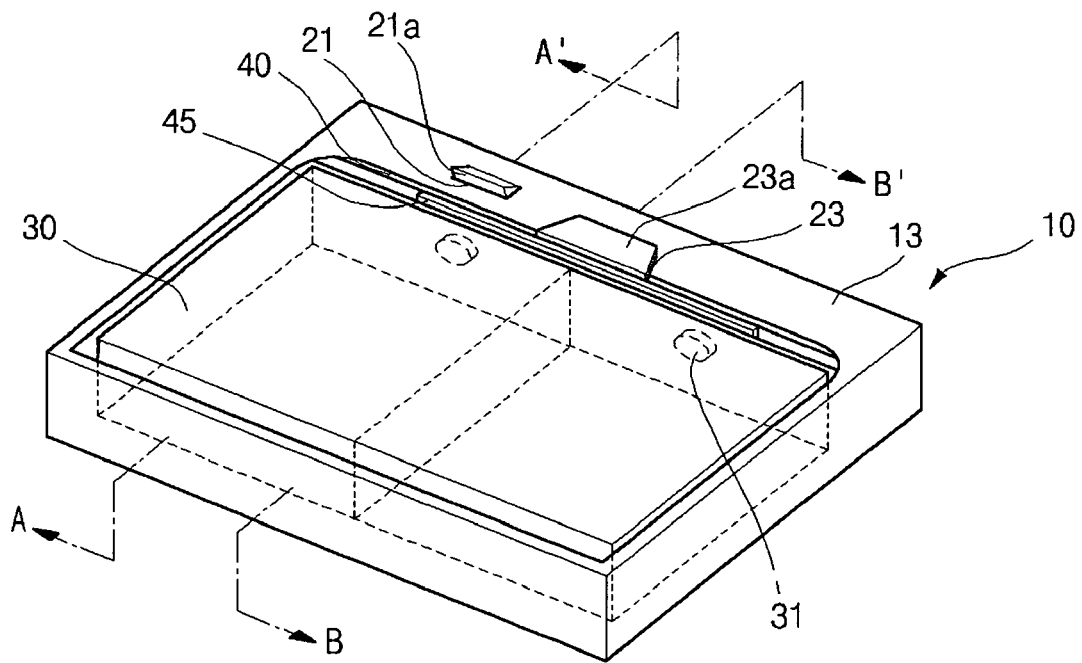
FIG. 2 is a perspective view illustrating a secondary battery mounted in a pack case according to one embodiment of the present invention.
Figure 3B:
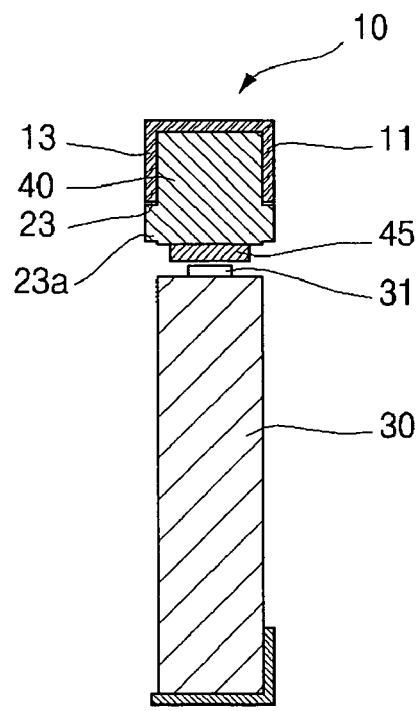
FIG. 3b is a sectional view taken along line B-B' shown in FIG. 2.
Figure 4:
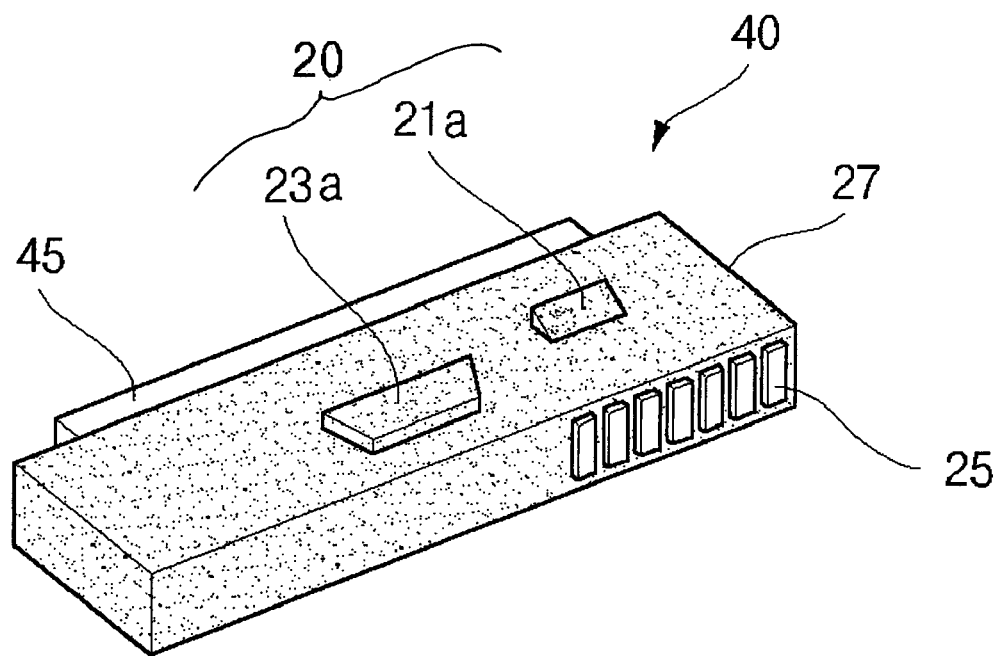
FIG. 4 is a perspective view illustrating a circuit section of a secondary battery according to one embodiment of the present invention.

As shown in FIG. 3b, the guide protrusion 23a has a substantially trapezoidal shape and protrudes outward from the frame 10 in which a width of the guide protrusion 23a gradually widens as it extends towards the inner portion of the frame 10 as seen in FIG. 2.

Thus, when the circuit section 40 is installed in the frame 10, the guide protrusion 23a is accommodated in the guide groove 23 having a shape substantially identical to that of the guide protrusion 23a, thereby fixing the circuit section 40 installed in the frame 10 while aligning the circuit section 40 with respect to the frame 10. In one exemplary embodiment, the guide protrusion 23a is a molded from synthetic resin.

Hereinafter, an assembling process for the battery pack according to one embodiment of the present invention will be described.

First, the circuit section 40 is connected to the lead wire 45 to be connected to an electrode terminal 31 of the secondary battery 30. Then, the circuit section 40 equipped with the lead wire 45 is mounted on the mounting ledge 11 of the frame 10, allowing an upper surface of the circuit section 40 to make contact with the guide member 13.

In addition, the guide protrusions 23a having a substantially trapezoidal shape are inserted into the guide grooves 23 formed in the mounting ledge 11 and the guide member 13 of the frame 10, thereby fixedly aligning the circuit section 40 with respect to the frame 10.

The inclined surface of the fixing protrusion 21a guides the circuit section 40 while the circuit section 40 is being installed in the frame 10 and the fixing protrusion 21a is inserted into the fixing hole 21, allowing the circuit section 40 to be fixed to the frame 10.

The secondary battery 30 is then rested on the mounting ledge 11 of the frame 10 in such a manner that the electrode terminal 31 of the secondary battery 30 makes contact with the lead wire 45.

Accordingly, the circuit section 40 is fixed to the frame 10 by means of the fixing part 20 so that the secondary battery 30 is prevented from becoming disconnected from the circuit section 40.

As mentioned above, according to the battery pack of the present invention, the circuit section is fixed to the frame by means of the fixing part so that the circuit section may be prevented from moving when it has been installed in the frame. Accordingly, the secondary battery may be prevented from being disconnected from the circuit section.

In addition, the fixing part may guide the circuit section and the secondary battery when they are installed in the frame, so the circuit section can be easily attached to or detached from the frame.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A battery pack comprising:
   a secondary battery;
   a frame for mounting the secondary battery therein, the frame including sidewalls, a first edge and a second edge opposite the first edge, a mounting ledge protruding from the first edge and a guide member protruding from the second edge, wherein at least one of the mounting ledge or the guide member has a fixing hole;
   a circuit section between the mounting ledge and the guide member and connected to the secondary battery; and
   a fixing part on the circuit section for fixing the circuit section to the frame, the fixing part having a fixing protrusion protruding through the fixing hole.

2. The battery pack as claimed in claim 1, wherein a reinforcement member is injection molded on the circuit section.

3. The battery pack as claimed in claim 1, wherein the circuit section is detachably coupled to the frame by the fixing part.

4. The battery pack as claimed in claim 1, wherein both the mounting ledge and the guide member have a fixing hole and wherein the fixing protrusion comprises a first fixing protrusion protruding through the fixing hole in the mounting ledge and a second fixing protrusion protruding through the fixing hole in the guide member.

5. The battery pack as claimed in claim 1, wherein the fixing protrusion has an inclined surface protruding away from the frame, the inclined surface rising towards an inner front portion of the frame.

6. The battery pack as claimed in claim 5, wherein the fixing protrusion comprises synthetic resin.

7. The battery pack as claimed in claim 1,
   wherein the frame has a guide groove in the mounting ledge for accepting a guide protrusion; and
   wherein the circuit section has a guide protrusion in the guide groove.

8. The battery pack as claimed in claim 7, wherein the guide protrusion has a substantially trapezoidal shape in which a width of the guide protrusion gradually widens as it extends towards an inner portion of the frame.

9. The battery pack as claimed in claim 8, wherein the guide protrusion comprises synthetic resin.

* * * * *